Feb. 24, 1942.　　J. R. BATES　　2,273,826
FLUID TREATING APPARATUS
Filed Dec. 8, 1939
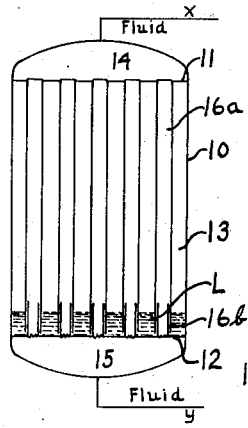
Fig.1
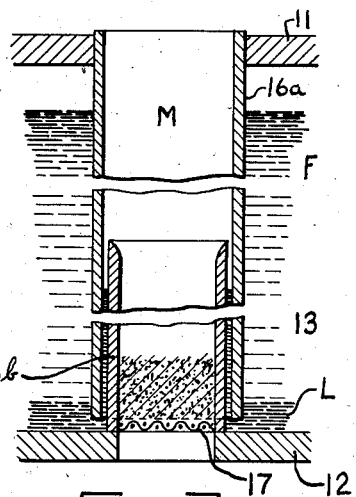
Fig.2
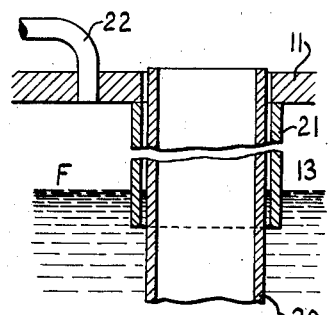
Fig.3
Fig.4
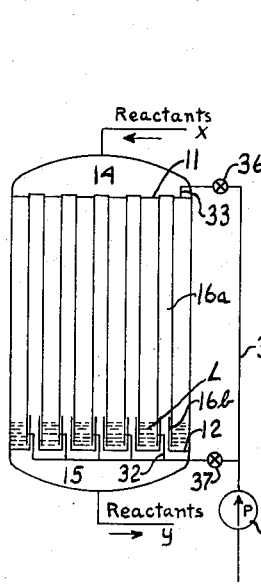
Fig.5
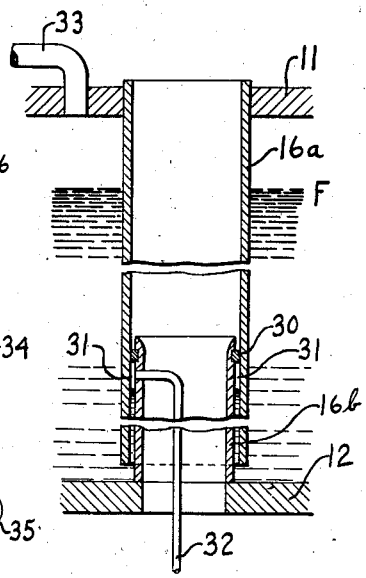
Fig.6
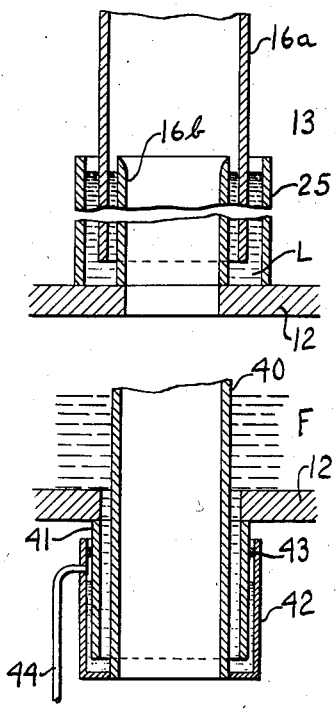
Fig.7
INVENTOR
John R. Bates
BY
Ira L. Nickerson
ATTORNEY Patented Feb. 24, 1942

2,273,826

UNITED STATES PATENT OFFICE 2,273,826

FLUID TREATING APPARATUS

John R. Bates, Swarthmore, Pa., assignor to Houdry Process Corporation, Wilmington, Del., a corporation of Delaware Application December 8, 1939, Serial No. 308,193

4 Claims. (Cl. 23—288)

The present invention relates to fluid treating apparatus and is concerned particularly with such apparatus which undergoes temperature changes during its operation and expands or contracts in accordance with the extent and direction of the temperature change.

In its broader aspects the invention contemplates the utilization of complementary conduit sections for passing material, particularly fluids, through a chamber out of direct contact with any substance contained in the chamber and associating the conduits with respect to each other and to the chamber walls so that free expansive or contractive movement of the conduit sections is provided. More specifically, the conduit sections are each arranged with one end portion fixed in registration with an aperture in a wall of the chamber and their other end portions disposed in telescoping relationship and spaced to receive a liquid and provide a seal between the conduit sections and the chamber. The seal may be formed by a liquid contained in the chamber for controlling the temperature of the apparatus during its operation or it may be a special sealing liquid, having a high specific gravity, which is maintained between the telescoping end portions.

The invention, although having broad application, is particularly useful for apparatus which is used in endothermic and/or exothermic reactions effected in the presence of contact material wherein the different apparatus parts experience a higher or lower temperature due to the heat of reaction from the contact treating operation. A common use for such contact treating apparatus is in a cyclic operation for carrying out reactions which have different temperatures of reaction and resultant contractive or expansive movement of the apparatus parts during the cycle. When the cycle of operations is alternately endothermic and exothermic the invention finds great utility since the temperature of the apparatus is alternately raised or lowered and the extent of movement of its operating parts during a cycle of operations may be considerable. One object of the invention is to provide converter apparatus having different operating parts which are arranged to permit relative movement during operation. Another object is to provide converter apparatus having a chamber with complementary conduit sections arranged to pass fluid through but out of direct contact with the chamber. Another object is to provide a converter having a fluid chamber with complementary conduit sections which have open ends within the chamber disposed in sealed and movable relationship with the chamber. Other objects of the invention are to provide a converter having a fluid chamber and conduits having spaced telescoping free end portions within the chamber with an expansion liquid seal between the free end portions, and to provide for maintaining the liquid seal at the desired level between the free end portions.

In order to illustrate the invention concrete embodiments thereof are shown in the drawing in which:

Fig. 1 is a sectional view of a converter incorporating one form of the invention and showing diagrammatically fluid supply and removal lines.

Figs. 2, 3 and 4 are sectional detail views of other modifications of the invention applied to the converter shown in Fig. 1.

Fig. 5 is a sectional view of a converter incorporating another modified form of the invention and showing diagrammatically reactant supply and removal lines.

Fig. 6 is a sectional detail view of a portion of Fig. 5.

Fig. 7 is a sectional detail view of a modification of the invention applied to an exterior wall of a chamber.

Referring to Fig. 1 numeral 10 indicates a converter casing having partitions 11 and 12 extending thereacross and forming with its side wall a chamber 13 and also forming with the upper and lower end walls respectively, reactant manifolds 14 and 15. Fluid lines X and Y as indicated are in communication with the manifolds 14 and 15 for supplying reactants or heat exchange fluid to one manifold and removing the fluid from the other manifold. Apertures are provided in each of the partitions 11 and 12 to cooperate with conduit sections associated therewith for passing fluid through the chamber 13. One conduit section is arranged to complement another section and provide for uninterrupted passage of the fluid and at the same time the conduits are disposed in a manner to permit expansive and contractive movement in accordance with variations in temperature which may occur within the chamber. A set of conduit sections 16a has its upper end portions secured in registration or alignment with the upper partition 11 in communication with the upper manifold 14 and extends downwardly through the chamber 13 having the other end portions disposed in registration with an aperture in the lower partition 12 and in spaced relation with the partition to permit downward expansion. Another set of conduits 16b has its lower end portions held in registration with the apertures in the partition 12 in communication with the manifold 15 and its upper end portions disposed in spaced telescoping relation with the lower end portions of the conduits 16a, permitting upward expansion of conduit 16b. A layer of liquid L is provided on the bottom partition 12 and extends upwardly in the space provided between the telescoping end portions of the conduits, to a level below the upper end of conduits 16b, providing a liquid seal between the conduits and chamber 13. In this form of the invention any liquid may be used to form the seal, the only requirement necessary is that the liquid level be sufficient to permit the liquid to enter the space between the telescoping end portions. The chamber 13 may contain any substance, fluid or otherwise and when necessary, depending on the material in the chamber, suitable means may be provided to maintain the layer of sealing liquid in its proper sealing relation with the telescoping end portions of the conduits. If the converter is to be used for carrying out either exothermic or endothermic contacting operations the contact material may be contained in the chamber 13 and heat exchange fluid circulated through the conduits to control the reaction temperature by indirect heat exchange with the contact material; or the contact material may be disposed in the complementary conduit sections and a heat exchange fluid circulated over the layer of sealing liquid and around the conduits for controlling the reaction temperature.

In Fig. 2 the invention is shown as applied to a fluid contacting apparatus in which the conduits 16a and 16b contain contact material M of any desired type or activity which may be maintained in the conduits by means of screen 17. The chamber 13, in addition to containing the layer of sealing liquid L, contains a body of other liquid F which may be circulated for controlling the temperature of the contact material in the conduits. The temperature controlling liquid F will have a low specific gravity as compared with that of the sealing liquid and may consists of any suitable material such as water or a mixture of fused salts while the layer of sealing liquid may consist of mercury, molten tin, lead or metal alloys or any other liquid denser than the heat exchange medium. The extent or height of the liquid seal can be predetermined from its specific gravity relative to the specific gravity and height of the heat exchange liquid. When the pressure of any reactant fluid which is to be supplied to the contact material M in the conduits is equal to the pressure maintained on the surface of the heat exchange liquid F, the sealing liquid will rise in the space between the telescoping portions of the conduits to a height equal to the product of the specific gravity of the heat exchange liquid and its height divided by the specific gravity of the sealing liquid. For example, if water having a specific gravity of 1 is used for the body of heat exchange liquid and has a height of 20 feet and mercury having a specific gravity of about 13.5 is used as the sealing liquid, the height to which the mercury would rise in the space between the conduits will be approximately 1½ feet. When pressure of reactants and pressure on the body of liquid F vary relatively the liquid level of the seal will vary in accordance with the variations. For example, a change in pressure in the conduits 16a and 16b of one pound per square inch will result in a change in the height to which mercury sealing liquid would rise of about two inches.

The modifications shown in Fig. 3 is adapted for carrying out contacting operations wherein the conduits contain the contact material and the seal is formed by the heat exchange fluid which is disposed within the chamber and around the conduits. Conduit 20 is positioned within the chamber 13 and extends upwardly into an aperture in the upper partition 11 in spaced and movable relation therewith. A second conduit is secured in registering relation with the partition aperture and has an end portion extending into the body of fluid F providing a space around the upper portion of conduit 20 which receives the heat exchange liquid and provides a seal between the conduits. In order to maintain the liquid in the space and provide a constant seal when reactants are supplied to the contact material in the conduits, the partition 11 is provided with one or more tubes 22 which supply an extraneous fluid to the chamber 13 to control the pressure on the body of liquid F and maintain it at least as great as the pressure exerted by the reactants on the sealing liquid in the space between the conduits.

The modification shown in Fig. 4 is generally similar to that form of the invention disclosed in Fig. 2 but provision is made for an independent liquid seal for each set of complementary conduit sections. Similarly to Fig. 2, the conduit 16a is secured to the upper partition 11 and has an end portion extending downwardly in spaced relation with the lower partition 12, while the conduit 16b is positioned in registering relation with an aperture in the lower partition 12 and has an end portion extending upwardly in spaced telescoping relation with the lower end portion of conduit 16a. The conduit 25 forms a well which is adapted to receive a layer of the desired sealing liquid L which will be high enough to extend upwardly into the space between the telescoping end portion of the conduits 16a and 16b. This form of the invention is particularly adapted for using a heavy liquid layer for the seal and a supernatant body of light fluid as the heat exchange medium. Normal changes in pressure during operations of a converter using the modification of the invention can be taken care of by increasing the height of conduits 16b and 25 to provide a liquid well which is deeper than is necessary for constant pressure conditions.

Figs. 5, 6 and 7 show modifications of the invention wherein provision is made for positively maintaining the liquid seal at the desired height in the space between the complementary conduit sections. In Fig. 5 the converter is constructed similarly to that shown in Fig. 1 and also has the conduit sections 16a and 16b disposed in the same relationship with each other and with the partitions 11 and 12. The invention as applied to the converter in Fig. 5 is adapted for carrying out contacting operations wherein the complementary conduits contain contact material and reactants pass through the contact material from manifolds 14 or 15. This modification is shown in detail in Fig. 6 and consists of a ring 30 positioned between the telescoping end portions of the conduits 16a and 16b adjacent the upper end of the conduit 16b which permits the conduits to expand or contract but in addition acts to form a pressure zone 31 above the liquid column, which has a fluid line 32 in communication therewith for supplying an extraneous pressure controlling fluid. The seal in this instance may be formed by the heat exchange medium F which extends within the chamber to any desired height, preferably to a point adjacent the upper partition 11 so that complete control of the temperature of the contact material in the conduits may be had. Another fluid line 33 is shown in communication with the top of the body of heat exchange liquid for similarly supplying an extraneous medium for regulating the pressure on the body of heat exchange liquid. As shown in Fig. 5, the conduits 32 and 33 are interconnected by a supply line 34 and have a pump 35 therein for supplying the extraneous medium at any pressure desired to maintain the pressure above the body of liquid and within the pressure zone 31 at least as great as the pressure of the reactants passing through the conduit sections. Valves 36 and 37 are provided for independently regulating the pressure to conduits 32 and 33.

Fig. 7 is a modification of the embodiment shown in Figs. 5 and 6 and is adapted for providing an independent liquid seal for complementary conduits exteriorly of the chamber. The seal may be formed by a heat exchange liquid alone or a bottom layer of heavy liquid may be used for the seal. The conduit 40 extends through an aperture in the partition 12 in spaced relation with the walls of the aperture and has a free end portion positioned exteriorly of the partition. A second conduit 41 is fixed in registration with the aperture and has an end portion extending outwardly of the partition in spaced telescoping relation with the end portion of conduit 40. A flanged conduit 42 is secured to the conduit 40 adjacent its end providing a well which is in communication with liquid F in the chamber 13 and the conduit 41 extends into the well in spaced relation with the bottom of the flanged conduit 42 providing an arrangement which permits both conduits 40 and 41 to expand downwardly. A ring 43 is provided between the flanged conduit 42 and conduit 41 and forms with the liquid column between conduits 41 and 42 a pressure zone having an extraneous fluid supply conduit 44 in communication therewith for maintaining any desired pressure on the liquid in the well.

While not specifically shown in the drawing, it is to be understood that the fluid used for heat exchange may be circulated within any converter and, if desired or required for proper temperature control, additional heating or cooling equipment may be provided within the converter or exteriorly thereof through which the heat exchange medium may be circulated. Further the invention contemplates liquid seals which will withstand wide pressure variations including the application of a vacuum to the conduits, as for example, in a vacuum purging operation on contact material contained in the conduits.

The various modifications of the invention as shown in the drawing are to be considered as illustrative rather than limiting and the invention includes all changes, modifications and adaptations within the scope of the appended claims.

I claim as my invention:

1. Apparatus for treating fluids in the presence of a contact mass comprising a casing having opposed side and top and bottom end walls providing a chamber, a body of heat exchange liquid in said chamber for controlling the temperature of the contact mass, apertures in the opposed end walls of the chamber, sets of conduits secured in registration with the opposed wall apertures, the conduits of one set extending into the chamber in a direction opposite to that of the conduits of the other set, each of said conduits having free end portions within the chamber, the free end portion of the conduits of one set being disposed in spaced telescoping relation with the free end portions of the conduits of the other set, contact mass in said conduits, sealing liquid between the spaced free end portions of the conduits, said sealing liquid having a higher specific gravity than the specific gravity of the heat exchange liquid in the chamber and being disposed below the heat exchange liquid.

2. In apparatus for treating fluids, in combination, a casing providing a chamber having apertured upper and lower walls, a body of liquid disposed in said chamber, a plurality of fluid conduits fixed to said upper wall in registering relation with apertures therein and extending through said body of liquid and toward said lower wall to have open ends within said liquid, complementary fluid conduits fixed to the lower wall in registering relation with apertures therein and having free ends extending within said first named conduits, said conduits cooperating to form restricted passageways for fluid through and between said walls and to form therebetween elongate chambers receiving columns of said liquid, means providing friction joints between said first and second named conduits adjacent the tops of the latter, and means for admitting fluid at controlled pressure to the upper portion of said elongate chambers to maintain said columns at controlled level below said friction joints independently of the pressure of fluid within said conduits.

3. In apparatus for effecting contact reactions, a casing having spaced upper and lower perforated walls thereacross and an interconnecting side wall defining a chamber, a body of heat exchange liquid in said chamber, conduits containing contact material extending between said upper and lower wall, said conduits comprising upper portions fixed to said upper wall in registering relation with perforations therein and having a free end extending into said liquid and lower portions fixed to said lower perforated wall in registering relation with perforations therein extending into the free end of the upper conduit portions and coextending with the latter to form therebetween columnar spaces communicating with and receiving liquid from the chamber, said spaces being of sufficient height to extend beyond the level sought therein by said liquid, means for passing reactants through said conduits, and means for adjusting pressure on said heat exchange fluid to maintain the liquid in the columnar spaces at the desired height.

4. Apparatus for treating fluids comprising a chamber having opposed side and top and bottom end walls, apertures in the top and bottom end walls, a conduit secured in an aperture in the top end wall and having a free end portion extending downwardly therefrom, a conduit secured in an aperture in the bottom end wall and having a free end portion extending upwardly therefrom, said conduit free end portions being positioned in spaced telescoping relation with each other, an enlarged conduit surrounding the outer of the telescopic free end portions in spaced relation therewith and forming a well with the bottom end wall, contact material in said first mentioned conduits, heat exchange fluid surrounding the conduits for controlling the temperature of the contact material and a sealing liquid in said well having a higher specific gravity than the heat exchange liquid and permitting relative movement between the said free ends of the conduits.

JOHN R. BATES.